(12) United States Patent
Kim et al.

(10) Patent No.: US 12,111,011 B2
(45) Date of Patent: Oct. 8, 2024

(54) DISPLAY STAND

(71) Applicant: LG ELECTRONICS INC., Seoul (KR)

(72) Inventors: Sanghoon Kim, Seoul (KR); Chunho Byun, Gwangmyung-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/970,059

(22) Filed: Oct. 20, 2022

(65) Prior Publication Data

US 2023/0122578 A1   Apr. 20, 2023

(30) Foreign Application Priority Data

Oct. 20, 2021   (KR) .................. 10-2021-0140403

(51) Int. Cl.
*F16M 11/00* (2006.01)
*F16M 11/20* (2006.01)

(52) U.S. Cl.
CPC ... *F16M 11/2064* (2013.01); *F16M 2200/068* (2013.01)

(58) Field of Classification Search
None
See application file for complete search history.

(56) References Cited

U.S. PATENT DOCUMENTS

| | | | |
|---|---|---|---|
| 2004/0245419 A1* | 12/2004 | Sweere | F16M 11/105 248/278.1 |
| 2008/0038050 A1 | 2/2008 | Chen et al. | |
| 2008/0054133 A1 | 3/2008 | Huang | |
| 2009/0090831 A1* | 4/2009 | Henning | F16C 11/10 248/278.1 |

(Continued)

FOREIGN PATENT DOCUMENTS

| | | |
|---|---|---|
| CN | 201661832 | 12/2010 |
| JP | H116520 | 1/1999 |

(Continued)

OTHER PUBLICATIONS

Korean Intellectual Property Office Application Serial No. 10-2021-0140403, Office Action dated Jan. 26, 2023, 5 pages.

(Continued)

*Primary Examiner* — Steven M Marsh
(74) *Attorney, Agent, or Firm* — LEE, HONG, DEGERMAN, KANG & WAIMEY

(57) ABSTRACT

Disclosed is a display stand including a first rotational coupling unit, and the first rotational coupling unit includes a coupling member installed in a central part of a first link and configured to pass through the first link and a second link so as to allow the first link and the second link to be rotatable in leftward and rightward directions, metal bushes installed on an outer surface of the coupling member so as to surround the coupling member and inserted into the first link so as to press the first link, and first toothed lock washers installed on the outer surface of the coupling (Continued)

member so as to surround the coupling member, disposed on outer surfaces of the metal bushes, and configured to have connection members provided towards an inner surface of the first link so as to be pressed against an inner surface of the second link.

15 Claims, 10 Drawing Sheets

(56) References Cited

U.S. PATENT DOCUMENTS

| | | | | |
|---|---|---|---|---|
| 2011/0079692 | A1* | 4/2011 | Li | F16M 11/105 248/220.21 |
| 2011/0315843 | A1* | 12/2011 | Hung | F16M 13/022 248/278.1 |
| 2016/0281915 | A1 | 9/2016 | Bowman et al. | |
| 2019/0219220 | A1* | 7/2019 | Chou | F16M 11/24 |
| 2019/0301670 | A1* | 10/2019 | Glickstein | F16M 11/2064 |
| 2020/0191321 | A1 | 6/2020 | Kleist | |
| 2021/0388943 | A1* | 12/2021 | Miura | F16M 11/24 |
| 2023/0010833 | A1* | 1/2023 | Fei | F16M 11/041 |

FOREIGN PATENT DOCUMENTS

| | | |
|---|---|---|
| JP | 2003014191 | 1/2003 |
| KR | 1020040003757 | 1/2004 |

OTHER PUBLICATIONS

European Patent Office Application Serial No. 22201804.6, Search Report dated Feb. 21, 2023, 9 pages.

* cited by examiner (a)            (b)

DISPLAY STAND

CROSS-REFERENCE TO THE RELATED APPLICATION

Pursuant to 35 U.S.C. § 119(a), this application claims the benefit of earlier filing date and right of priority to Korean Patent Application No. 10-2021-0140403, filed on Oct. 20, 2021, the contents of which are hereby incorporated by reference herein in its entirety.

BACKGROUND OF THE INVENTION

1. Field of the Invention

The present disclosure relates to a display stand, and more particularly to a display stand which generates rotating torque in the upward, downward, leftward and rightward directions so as to adjust the angle of a monitor.

2. Description of the Related Art

In general, interest in miniaturization, thin thickness and high quality trends of display devices, i.e., transmission media of image information which is important in the information age, is being increased, and thereby, flat panel display devices as substitutes for cathode-ray tube (CRT) displays having a great volume are being developed and distributed.

Among these flat panel display devices, LCD monitors are widely used in recent times, and the LCD monitors display information on a liquid crystal panel depending on a signal input from the outside.

Here, a hinge structure for adjusting the angle of an LCD monitor depending on a user's eye level may be formed at the rear part of the LCD monitor, and most hinge structures are configured such that a highly elastic spring is installed on a shaft so as to adjust the angle of the LCD monitor using elastic force.

As another example, a plurality of circular special disc plates may be installed to overlap each other, and may be pressed in the axial direction, so as to adjust the angle of an LCD monitor using frictional force between the disc plates.

However, when the above-described structure is used for a long time, difficulty in adjusting torque and reduction in frictional force hinder support of the LCD monitor, an improper rotation angle between the LCD monitor and a support requires an unnecessary space to effectively package a product, thereby increasing manufacturing costs and weakening competitiveness among companies in the same line of business.

SUMMARY OF THE INVENTION

Therefore, the present disclosure has been made in view of the above problems, and it is an object of the present disclosure to provide a display stand which generates rotating torque in the upward, downward, leftward and rightward directions through coupling of a disc spring, in a hinge structure in which a plurality of washers and bushes are coupled to a coupling member serving as a rotating shaft, so as to adjust and fix the angle of a monitor, and includes a toothed lock washer disposed between the coupling member and the disc spring so as to prevent the coupling member from being loosened in the hinge structure even when the angle of the monitor is repeatedly adjusted.

In accordance with one aspect of the present disclosure, in order to achieve the above and other objects, a display stand may include: a display fixing unit; a first link coupled to the display fixing unit; a second link which is opposite to the display fixing unit with respect to the first link, and to which the first link is rotatably coupled; a first coupling member providing a rotation axis of the first link and coupled to an inner side of the second link through the first link; and a bush positioned between an outer surface of the first coupling member and an inner surface of the first link, and through which the first coupling member passes, wherein a portion of the bush may be positioned on the first link and presses the first link.

In accordance with another aspect of the present disclosure, a display stand may include: a first rotational coupling unit, wherein the first rotational coupling unit include: a first coupling member installed in a central part of a first link connected to a display fixing unit, and configured to pass through the first link and a second link connected to a display support so as to allow the first link and the second link to be rotatable in leftward and rightward directions; a metal bush installed on an outer surface of the first coupling member so as to surround the first coupling member, and inserted into the first link so as to press the first link due to rotation of the first coupling member; and a first toothed lock washer installed on the outer surface of the first coupling member so as to surround the first coupling member, disposed on outer surfaces of the metal bush, and configured to have a plurality of connection members provided towards an inner surface of the first link so as to be pressed against an inner surface of the second link.

In accordance with yet another aspect of the present disclosure, a display stand may include: a third link installed in which a first link connected to a display fixing unit and a second link connected to a display support are rotatably installed in a left and right directions, and which is installed between the display fixing unit and the first link so as to be fixed to the display fixing unit; and a second rotational coupling unit installed between the third link and the first link so as to enable the third link to be rotated upwards and downwards with respect to the first link and to enable the display fixing unit to be rotated 360 degrees in front of the third link.

In accordance with still another aspect of the present disclosure, a display device may include: a display; and a display stand to which the display is coupled.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the exemplary embodiments of the present disclosure, examples of which are illustrated in the accompanying drawings.

Advantages and features of the present disclosure and methods for achieving the same will become apparent from the descriptions of aspects hereinbelow with reference to the accompanying drawings.

However, the present disclosure is not limited to the aspects disclosed herein and may be implemented in various different forms. The aspects are provided to make the description of the present disclosure thorough and to fully convey the scope of the present disclosure to those skilled in the art. It is to be noted that the scope of the present disclosure is defined only by the claims.

Further, in the following description of the present disclosure, a detailed description of known functions and configurations incorporated herein will be omitted when it may make the subject matter of the present disclosure rather unclear.

Figure 1:
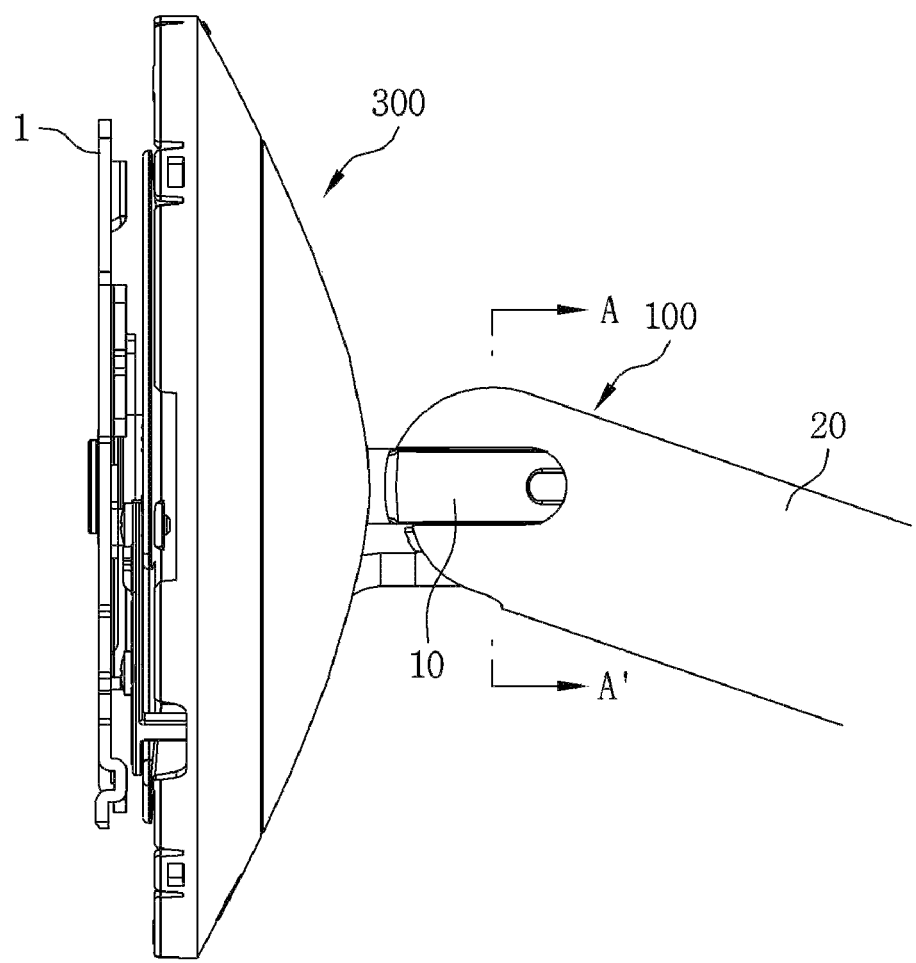
FIG. 1 is a side view showing a display stand according to one embodiment of the present disclosure.
Figure 2:
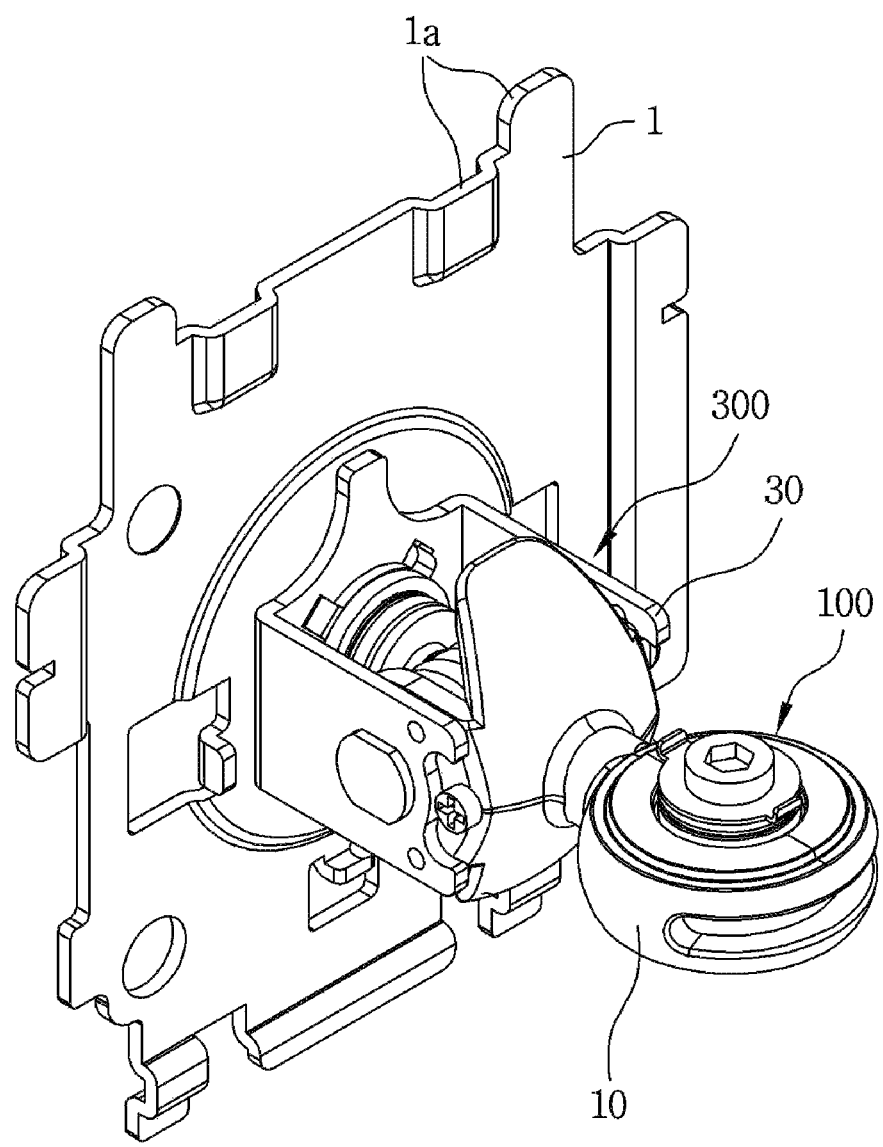
FIG. 2 is a perspective view showing a coupling structure of the display stand according to one embodiment of the present disclosure.

FIG. 1 is a side view showing a display stand according to one embodiment of the present disclosure, and FIG. 2 is a perspective view showing a coupling structure of the display stand according to one embodiment of the present disclosure.

Figure 3:
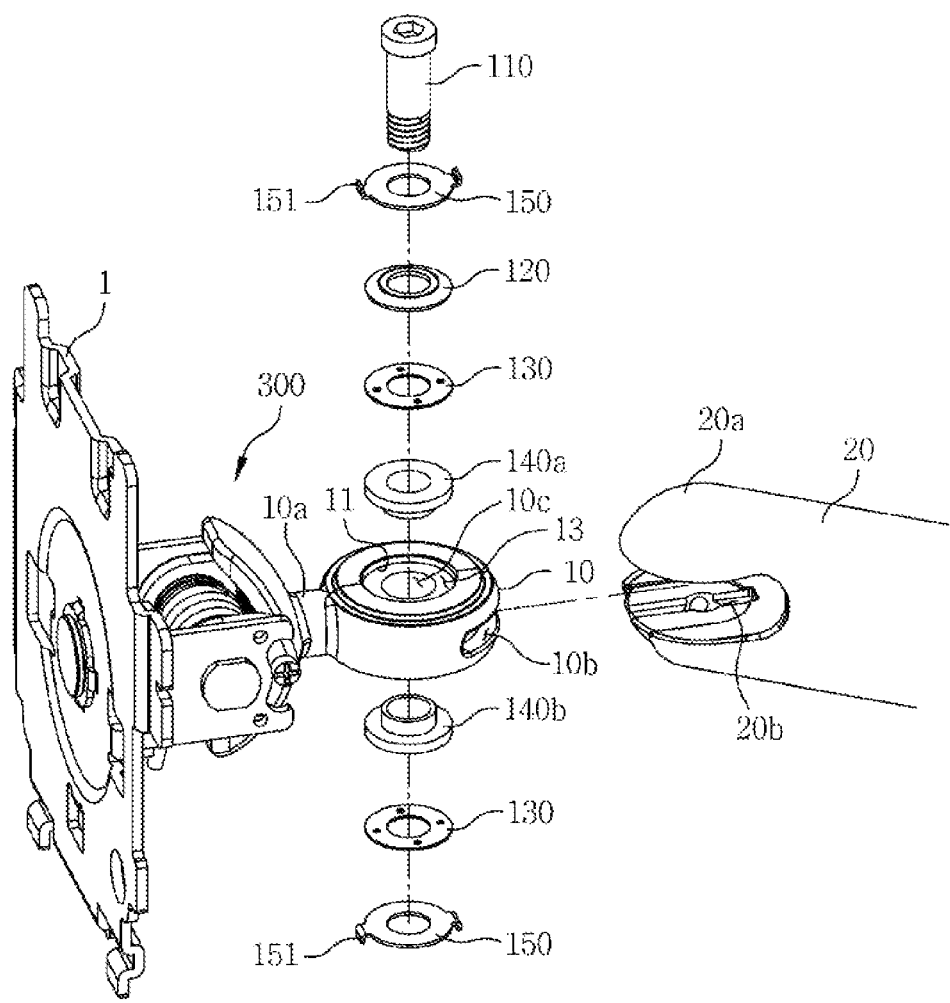
FIG. 3 is an exploded perspective view showing a first rotational coupling unit of the display stand according to one embodiment of the present disclosure.
Figure 4:
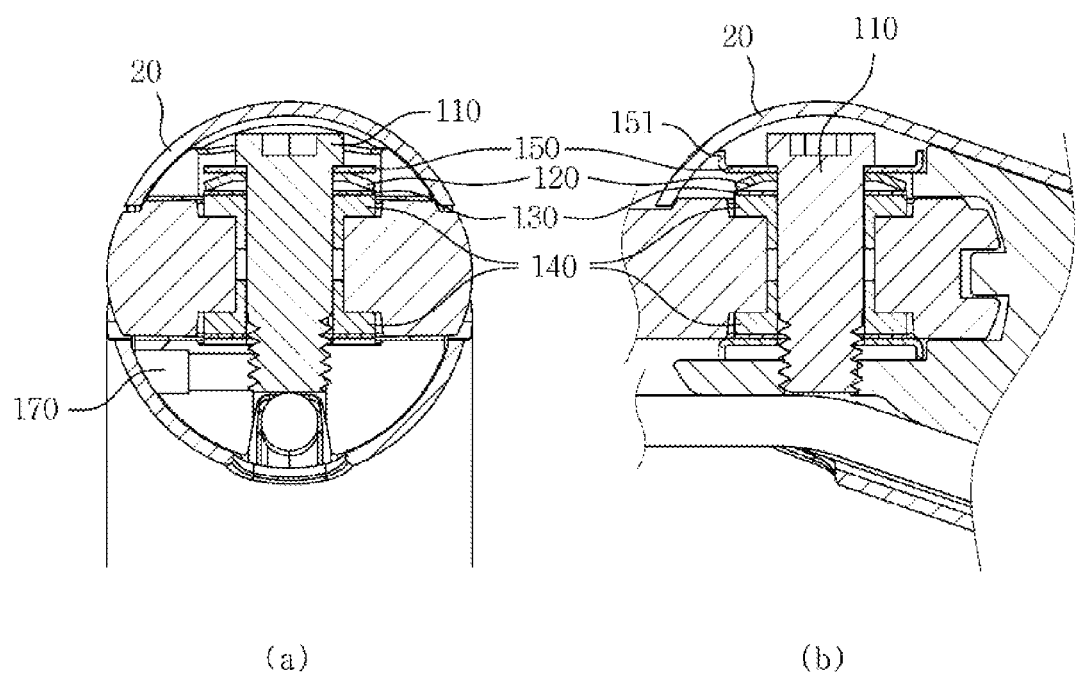
FIG. 4 is a cross-sectional view taken along line A-A' of FIG. 1, showing the coupled state of the first rotational coupling unit of the display stand according to one embodiment of the present disclosure.

Further, FIG. 3 is an exploded perspective view showing a first rotational coupling unit of the display stand according to one embodiment of the present disclosure, and FIG. 4 is a cross-sectional view taken along line A-A' of FIG. 1, showing the coupled state of the first rotational coupling unit of the display stand according to one embodiment of the present disclosure.

Figure 5:
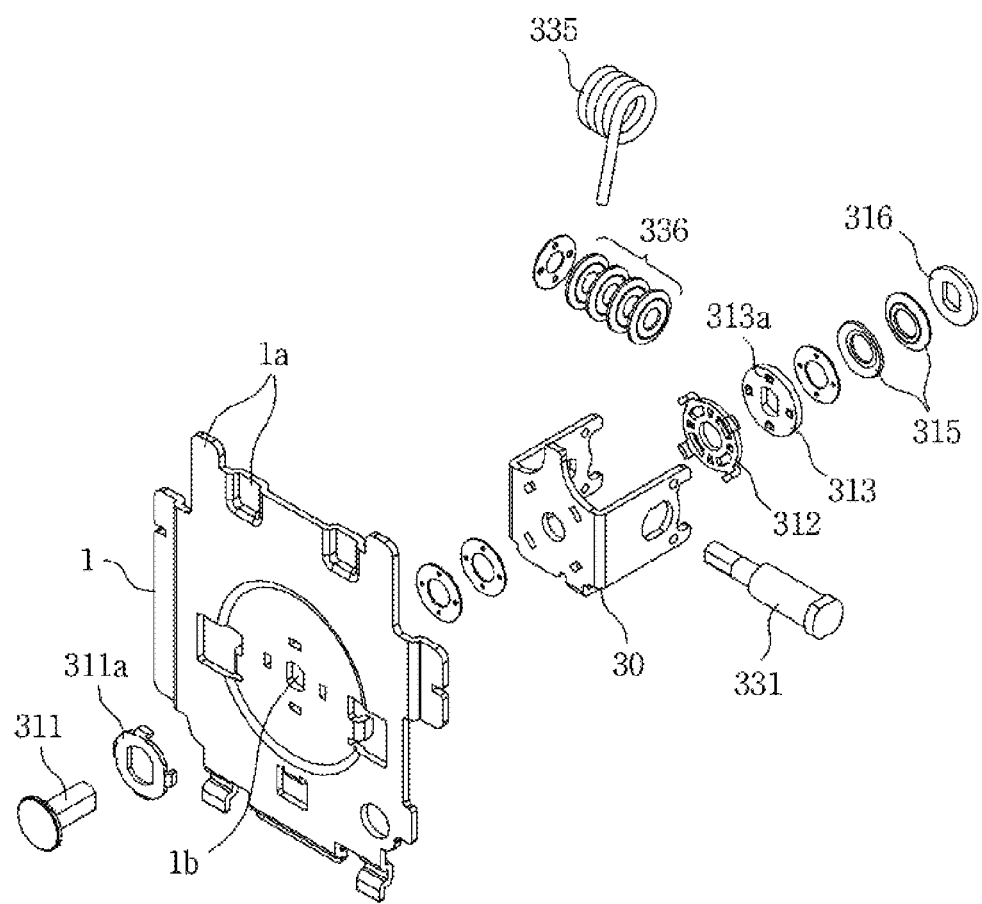
FIG. 5 is an exploded perspective view showing a second rotational coupling unit of the display stand according to one embodiment of the present disclosure.
Figure 6A:
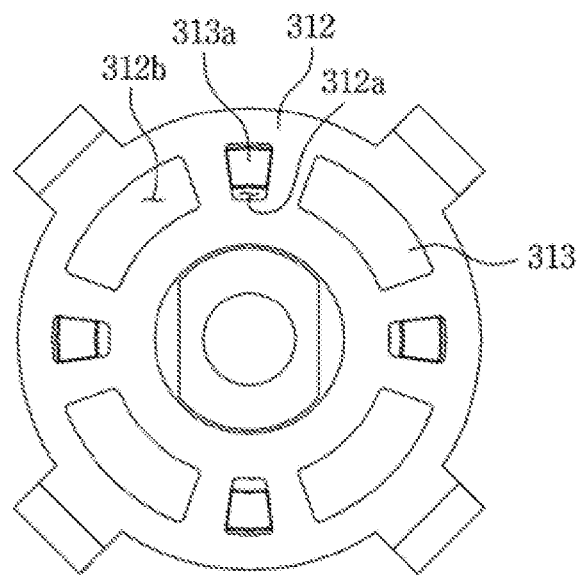
FIGS. 6A and 6B are views showing the rotated state of the second rotational coupling unit of the display stand according to one embodiment of the present disclosure.
Figure 6B:
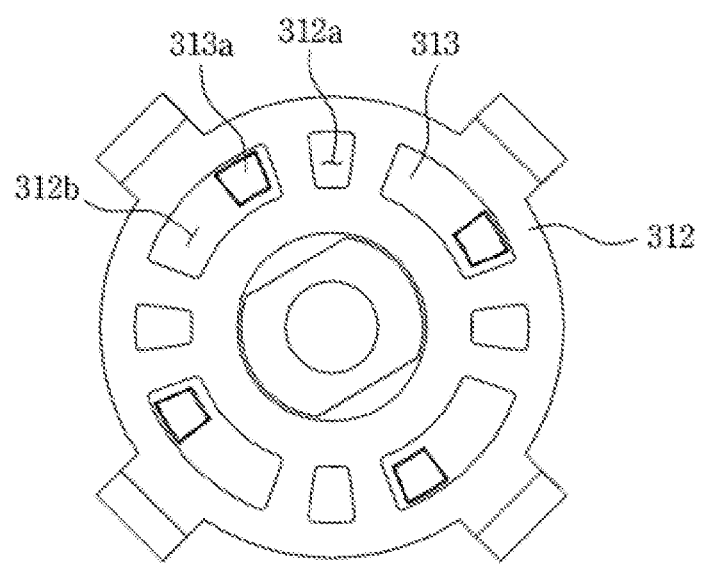

In addition, FIG. 5 is an exploded perspective view showing a second rotational coupling unit of the display stand according to one embodiment of the present disclosure, and FIGS. 6A and 6B are views showing the rotated state of the second rotational coupling unit of the display stand according to one embodiment of the present disclosure.

Figure 7:
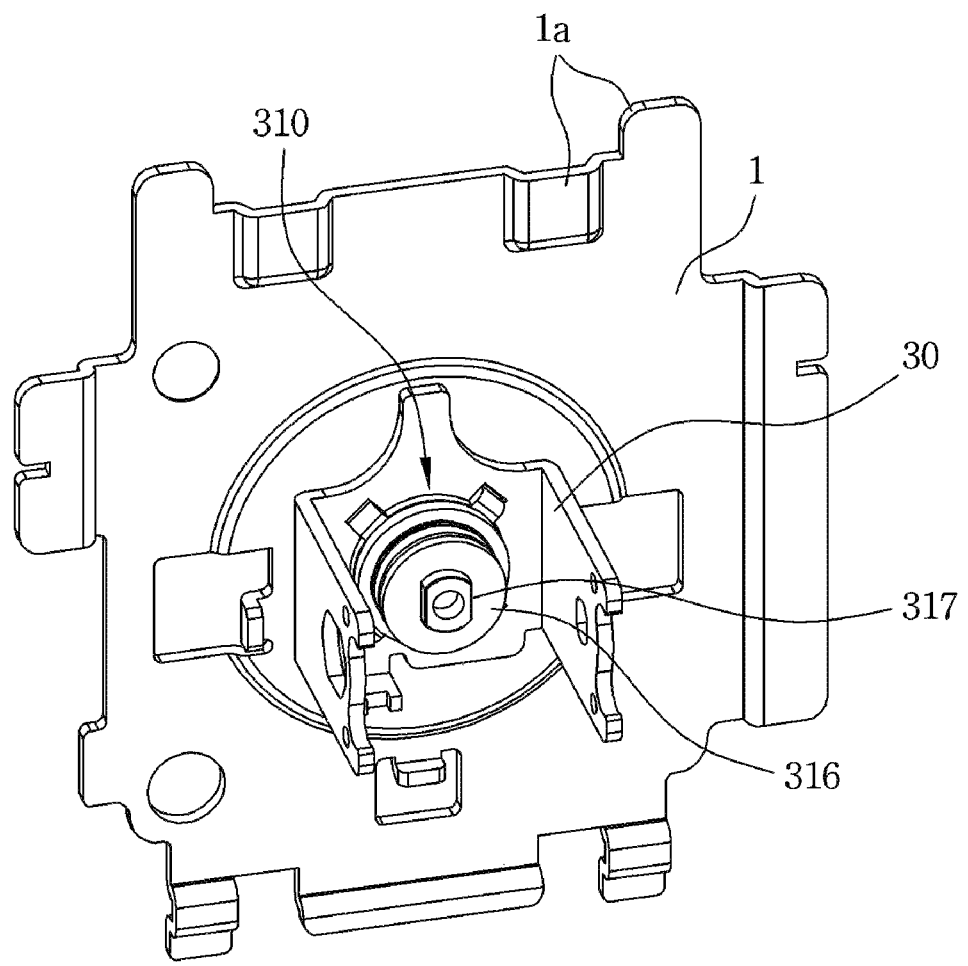
FIGS. 7 and 8 are perspective views showing the second rotational coupling unit coupled to the rear part of the display stand according to one embodiment of the present disclosure.
Figure 8:
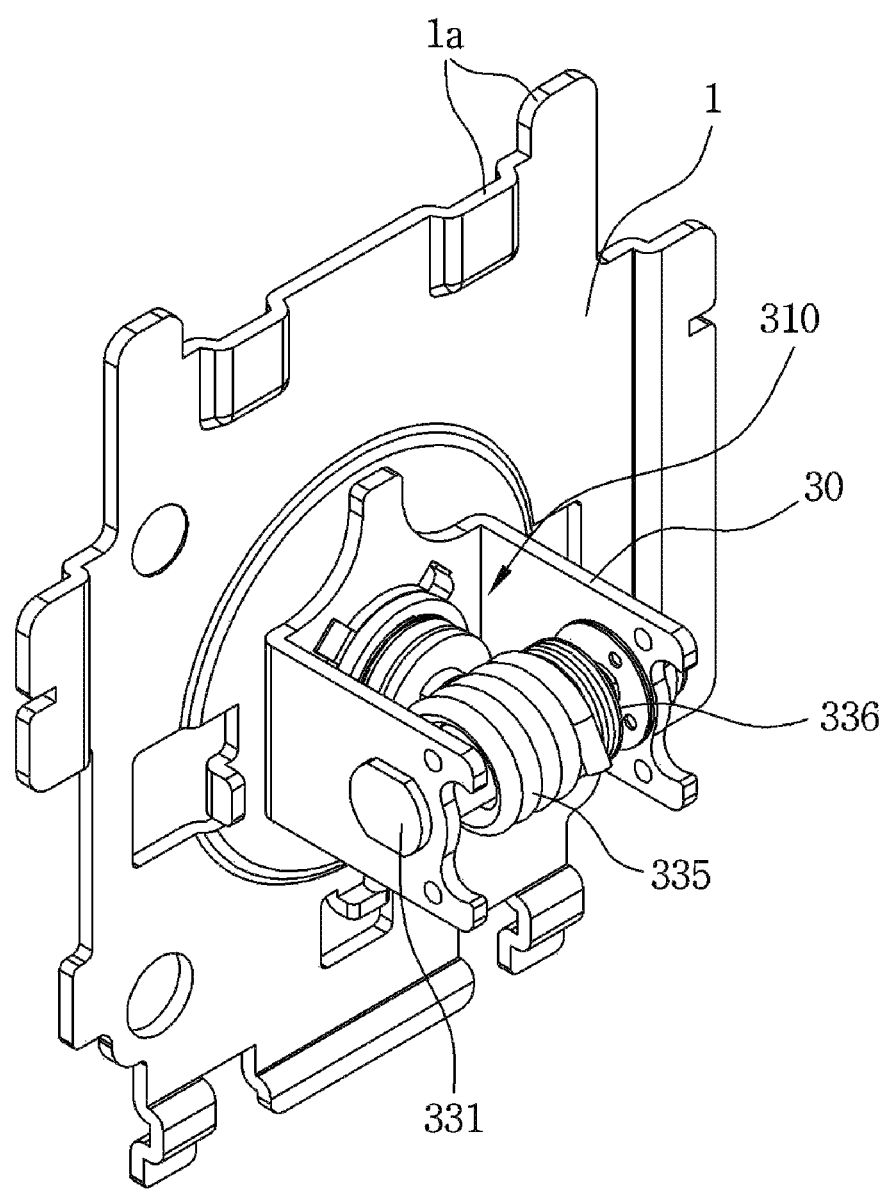
Figure 9:
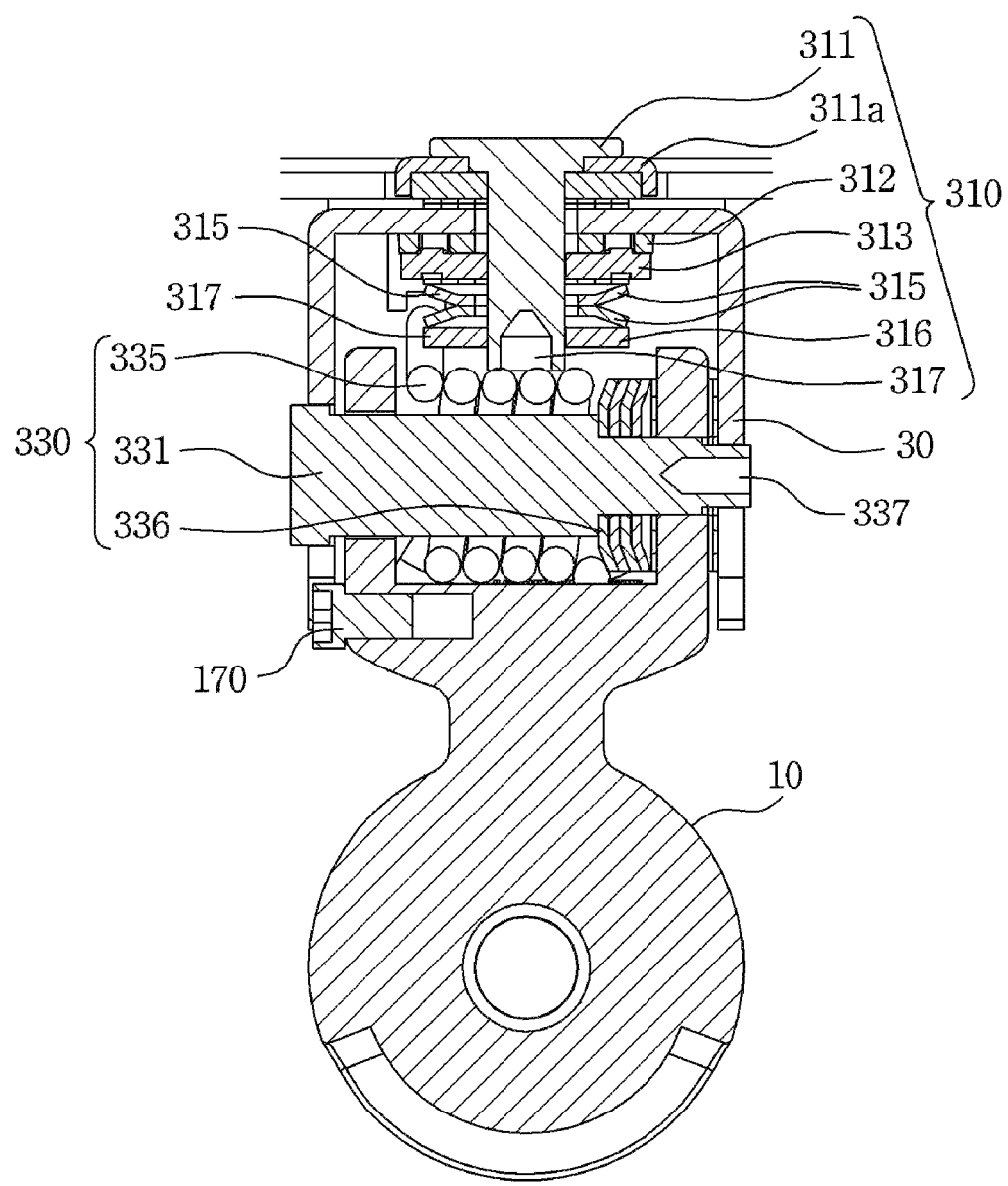
FIG. 9 is a cross-sectional view showing a first link and a third link of the display stand according to one embodiment of the present disclosure, as seen from the top.

FIGS. 7 and 8 are perspective views showing the second rotational coupling unit coupled to the rear part of the display stand according to one embodiment of the present disclosure, and FIG. 9 is a cross-sectional view showing a first link and a third link of the display stand according to one embodiment of the present disclosure, as seen from the top.

In FIG. 1, a direction towards the left is defined as a forward direction, and a direction towards the right is defined as a rearward direction. In FIG. 1, a direction towards the front is defined as a rightward direction, a direction towards the rear is defined as a leftward direction, a direction towards the bottom is defined as a downward direction, and a direction towards the top is defined as an upward direction.

Referring to FIGS. 1 to 4, the display stand according to this embodiment may include a first link 10, a second link 20, a third link 30, a first rotational coupling unit 100 and a second rotational coupling unit 300, and may adjust the angle of a monitor in the leftward, rightward, upward and downward directions through the structures of the first rotational coupling unit 100 and the second rotational coupling unit 300. The display stand may be referred to as a display friction stand, an apparatus for supporting a display, or a display cradle.

Here, a monitor fixing unit 1 may be a plate on which the display, such as a monitor, is fixedly installed. Further, a monitor support (not shown) may be configured such that one end thereof may be connected to the monitor fixing unit 1 and the other end thereof may be connected to a floor surface, and may thus serve as a support which supports the monitor fixing unit 1 in the state in which the monitor fixing unit 1 is spaced apart from the floor surface. The monitor fixing unit 1 may be referred to as a display fixing unit 1 or a head 1. The display may include a display panel such as an OLED panel, an LCD panel, or a LED panel, and may display an image in the front. The monitor support may be referred to as a display support. For example, the display support may include an arm extending along the second link 20 inside the second link 20, a pole intersecting the arm, and a base to which the pole is coupled and which is supported by the floor surface.

Although one embodiment of the present disclosure discloses a portion of the display stand installed at one end of the monitor support (not shown), i.e., the first link 10, the second link 20 and the third link 30 installed between the monitor fixing unit 1 and the monitor support (not shown), a plurality of first rotational coupling parts 100 and a plurality of second rotational coupling units 300 may be installed at the monitor support (not shown) as a large number of links is installed, so as to rotate the monitor support (not shown) several times when rotation of the monitor support (not shown) is required.

That is, a plurality of first rotational coupling parts 100 and a plurality of second rotational coupling units 300 are installed depending on the number of links coupled between the monitor fixing unit 1 and the monitor support, and thus, the monitor fixing unit 1 may be rotated several times with respect to the monitor support.

Further, attachment members 1a may protrude upwards and rearwards from the monitor fixing unit 1, and thus, the monitor may be coupled to or separated from the monitor fixing unit 1 through a one-touch method using the attachment members 1a, and a user may easily detachably attach the monitor to the monitor fixing unit 1.

Here, the first rotational coupling unit 100 includes a first coupling member 110, a first disc spring 120, space washers 130, bushes 140: 140a and 140b and toothed lock washers 150, and may be configured to connect the first link 10 extending from the monitor fixing unit 1 to the second link 20 connected to the monitor support (not shown) having a designated height so as to rotate the first link 10 in the leftward and rightward directions with respect to the second link 20. The bush 140 may be a metal bush 140.

The first link 10 may be formed to have a ring-shaped cross-section. Further, a first link protruding part 10a may protrude forwards from the front part of the first link 10 so that the third link 30 may be coupled thereto. Further, a first link opening 10b may be formed in the rear part of the first link 10.

Further, a central hole 10c may be formed through the first link 10 so that the first link 10 may be rotatably coupled to the second link 20 through the central hole 10c, and the first coupling member 110 and the metal bushes 140 may be coupled to the central hole 10c.

Here, the central hole 10c may be formed to have a shape corresponding to the first coupling member 110 so that the first coupling member 110 may pass through the central hole 10c. Further, fixing recesses 13 having a greater diameter than the diameter of the central hole 10c into which the coupling member 110 is inserted may be formed in the upper and lower surfaces of the inside of the central hole 10c. A bent part 11 may be formed by each of the fixing recesses 13 having the greater diameter than the diameter of the central hole 10c.

Here, the bent part 11 may be formed to have a reversed L shape, the metal bushes 140 having a reversed L-shaped cross-section may be inserted into the central hole 10c of the first link 10, and outwardly protruding parts of the metal bushes 140 may be caught by the fixing recesses 13 so that the corresponding metal bushes 140 may be placed in the central hole 10c and the fixing recesses 13.

Thereby, when the first link 10 and the second link 20 are pressed against each other by rotating the first coupling member 110, the metal bush 140 pressed against the inner surface of the first link 10 may be rotated, and the first link 10 pressed against the metal bush 140 may also be rotated.

Further, a second link protruding part 20a may protrude upwards from the second link 20 towards the first link 10. A second link opening 20b may be formed in the second link protruding part 20a, and the first link 10 may be inserted into the second link opening 20b so as to be coupled to the second link 20.

The first coupling member 110 is provided to pass through both a C-shaped end of the second link 20 and the first link 10 inserted into the second link 20.

Here, the C-shaped end of the second link 20 may reduce the weight of a part which is connected to the monitor fixing unit 1, and may increase the weight of a part which fixes the monitor fixing unit 1. That is, the weight of the monitor fixing unit 1 is reduced, and thus, the monitor fixing unit 1 may be easily fixed, and durability of the second link 20 which fixes the monitor fixing unit 1 may be improved, thereby being capable of improving durability of monitor fixing members which are formed of plastic or the like. More particularly, the first coupling member 110 has a designated length, and a screw thread is formed on the outer circumferential surface of one end of the first coupling member 110 which sequentially passes through one side of the second link 20 formed in a C shape and the inside of the first link 10 and is inserted into the other side of the second link 20.

Thereby, when the first coupling member 110 is rotated to couple the first link 10 to the second link 20, the first coupling member 110 may be inserted into a coupling hole H formed in the other side of the second link 20.

This serves to reduce the layout of a hinge structure, in the case in which the first coupling member 110 is coupled to the first link 10 and the second link 20 using a separate nut, the total length of the first rotational coupling unit 100 is increased, and therefore, the other side of the second link 20 may serve as a nut so as to achieve structure simplification.

The first disc spring 120 is installed on the second link 30, and is compressed as the first coupling member 110 is rotated in a coupling direction, thereby generating axial elastic force.

That is, the first disc spring 120 is a disc-shaped washer formed of an elastic material, and generates rotating torque through repetition of compression and release of compression due to shape characteristics thereof when the first link 10 is rotated leftwards and rightwards.

Here, a plurality of first disc springs 120 may be disposed to overlap each other so as to generate strong axial elastic force, when the first coupling member 110 is rotated to couple the first link 10 to the second link 20.

The space washers 130 serve to transmit the axial elastic force of the first disc spring 120 to the metal bushes 140, and to guide the metal bushes 140 pressed by the first disc spring 120 so as to rotate the metal bushes 140 in the leftward and rightward directions.

That is to say, since the first disc spring 120 generates elastic force through only the edge thereof due to shape characteristics thereof, the space washers 130 may transmit the elastic force to the metal bushes 140 through the entire area of the space washers 130, and may be rotated between the first disc spring 120 and the metal bushes 140.

That is, when the spacer washer 130 comes into contact with the first coupling member 110 inside the first disc spring 120 so that the rotating force of the first coupling member 110 is transmitted to the space washer 130, the space washer 130 comes into contact with the metal bush 140 and thus uniformly transmits the rotating force, distributed on the outwardly protruding part of the first disc spring 120, to the overall area of the metal bush 140, thereby being capable of minimizing abrasion of the inner or outer part of the first disc spring 120 occurring by the rotating force, and simultaneously improving transmission efficiency of the rotating force.

In the case in which the space washer 130 is omitted, the first disc spring 120 comes into direct contact with the metal bush 140, and thus, when the first link 10 is repeatedly rotated to adjust the angle thereof, the metal bush 140 may be damaged due to abrasion caused by friction, may cause noise, and may thus cause difficulty in normally adjusting the angle of the first link 10. Therefore, the space washer 130 is disposed between the first disc spring 120 and the metal bush 140 so as to prevent the above problem.

Here, a pair of space washers 130 is provided and is disposed to face a pair of metal bushes 140, i.e., an upper metal bush 140a and a lower metal bush 140b.

The upper metal bush 140a may have the reversed L-shaped cross-section so as to be fixed to the upper fixing recess 13 in the first link 10, and may be formed of a metal material so as to have high durability, and the lower metal bush 140b may have the same cross-section and be formed of the same material as the upper metal bush 140a so as to be fixed to the lower fixing recess 13 in the first link 10. Here, the upper metal bush 140a and the lower metal bush 140b may be formed of a material which has higher durability than the first link 10 and the second link 20 and generates great frictional force, thereby being capable of increasing fixing force between the first link 10 and the second link 20.

The upper metal bush 140a and the lower metal bush 140b are fixed to the upper fixing recess 13 and the lower fixing recess 13 in the first link 10, and serve to guide the first link 10 so as to axially rotate the first link 10 in the fixed state of the metal bushes 140, and serve to press the upper and lower parts of the first link 10.

The metal bushes 140 having the above-described structure may guide axial rotation of the first link 10 in the leftward and rightward directions in the state in which the axial elastic force generated by the first disc spring 120 is transmitted to the metal bushes 140, when the first coupling member 110 is coupled to the metal bushes 140, thereby enabling the first link 10 to be rotated and to be fixed at the rotated position thereof due to the elastic force transmitted to the metal bushes 140.

The first toothed lock washers 150, more particularly, an upper toothed lock washer 150 is disposed between the head part of the first coupling member 110 and the first disc spring 120 in the state in which the second link 20 is installed.

Further, connection members 151 may protrude from parts of the first toothed lock washers 150 in a designated direction, and the connection members 151 may be fixedly inserted into mount recesses (not shown) formed in the second link 20. For example, the connection members 151 of the first toothed lock washers 150 are inserted into the mount recesses (not shown) formed in the second link protruding part 20a, thereby being capable of preventing rotation of the first toothed lock washers 150.

That is, the first toothed lock washers 150 may serve to prevent the rotating force of the first disc spring 120 from being transmitted to the head part of the first coupling member 110 when the metal bushes 140 are rotated in the axial direction, and the connection members 151 may be fixedly inserted into the mount recesses (not shown) having a shape corresponding to the connection members 151 and formed in the second link protruding part 20a so as to prevent rotation of the first toothed lock washers 150.

That is, in the first rotational coupling unit 100 having the above-described structure, when the metal bushes 140 are rotated as the first link 10 reciprocates in the leftward and rightward directions, the space washers 130 are also rotated and thus the rotating force may be transmitted to the first disc spring 120, and, in this state, when the head part of the first coupling member 110 comes into contact with the first disc spring 120, the first coupling member 110 may be loosened due to the transmitted rotating force in the event of repeated rotation of the metal bushes 140.

In order to solve the above problem, the first toothed lock washers 150, more particularly, the upper first toothed lock washer 150 is disposed between the head part of the first coupling member 110 and the first disc spring 120, causes idling of the first disc spring 120 when the metal bushes 140 are rotated based on the rotation of the first link 10, and may thus prevent the rotating force of the first disc spring 120 from being transmitted to the first coupling member 110.

For this purpose, the first toothed lock washers 150 may have a through hole formed at the centers thereof so that the first coupling member 110 may pass therethrough, in the same manner as the first disc spring 120, the space washers 130 and the metal bushes 140, and may include the connection members 151 protruding upwards or downwards, and the positions of the first toothed lock washers 150 may be fixed by mounting the connection members 151 protruding upwards or downwards in the mount recesses (not shown) in the second link 20.

As described above, the first toothed lock washers 150 may prevent the rotating force of the first disc spring 120 from being transmitted to the first coupling member 110 through fixation of the first toothed lock washers 150 to the second link 20, and may transmit pressing force, generated by coupling of the first coupling member 110, to the first disc spring 120 so as to generate axial elastic force.

These first toothed lock washers 150 are provided in a pair, and the lower first toothed lock washer 150 is disposed under the space washer 130 disposed to be rotatable against the lower metal bush 140b, which presses the lower part of the first link 10.

Thereby, the first toothed lock washers 150, more particularly, the lower first toothed lock washer 150 disposed under the first link 10 may prevent contact between the spacer washer 130 and the other side of the second link 20 having the coupling hole (not shown) provided such that the first coupling member 110 is coupled thereto, and may thus prevent abrasion of the other side of the second link 20 when the space washer 130 is rotated by the rotating force transmitted by the lower metal bush 140b.

That is, when the lower metal bush 140b and the corresponding space washer 130 are repeatedly rotated by repeated rotation of the first link 10, the other side of the second link 20, which comes into direct contact with the lower metal bush 140b and the space washer 130, may be abraded due to characteristics of the material of the second link 20, and, in order to solve this problem, the first toothed lock washer 150 may be fixedly disposed between the corresponding space washer 130 and the other side of the second link 20.

Therefore, the first toothed lock washers 150 according to one embodiment of the present disclosure are provided in a pair, and prevent rotating force from being directly transmitted to the first coupling member 110 and the other side of the second link 20, thereby being capable of preventing the first coupling member 110 from being loosened and preventing the other side of the second link 20 from being abraded.

Further, referring to FIG. 9, a stopper 170 may be coupled to the right side of the first link 10. Here, only one stopper 170 may be coupled to the first link 10, and thus, cost reduction may be achieved.

As shown in FIGS. 5 to 8, the second rotational coupling unit 300 serves to rotate the first link 30 coupled to the monitor fixing unit 1 in the upward and downward directions with respect to the first link 10, and thereby adjusts the angle of the monitor (not shown) in the upward and downward directions.

That is, the second rotational coupling unit 300 connects the third link 30 provided in the monitor fixing unit 1 to the first link 10 so as to rotate the monitor fixing unit 1 in the upward and downward directions with respect to the first link 10.

The second rotational coupling unit 300 may include a first connection unit 310 and a second connection unit 320 so as to rotate the third link 30 with respect to the first link 10.

The first connection unit 310 may be configured to move the monitor fixing unit 1 and the third link 30 in the forward and rearward directions and to be moved rearwards so as to rotate the monitor fixing unit 1 when the first connection unit 310 is pressed, and may include a rotating shaft 311, a first fixing member 312, a rotating member 313, second disc springs 315 and a second fixing member 316.

A head part may be formed at the front part of rotating shaft 311 in a direction in which the monitor is attached to or detached from the monitor fixing unit 1. For example, the front end of the rotating shaft 311 may protrude outwards so as to be caught by the monitor fixing unit 1, thereby being capable of preventing the rotating shaft 311 from being separated rearwards from the monitor fixing unit 1.

Further, a part of the rotating shaft 311 which extends towards the third link 30 may have a cylindrical shape with both side surfaces which are flat. Here, the two side surfaces may be formed in parallel. Thereby, when the rotating shaft 311 is inserted into a circular hole, the rotating shaft 311 may be rotated. For example, the rotating shaft 311 may be formed in a rivet type.

A first connection member 311a may be provided between the head part of the rotating shaft 311 and the monitor fixing unit 1. The first connection member 311a may have a hole formed to have the same shape as the cross-section of the extending part of the rotating shaft 311 which is inserted into the third link 30, and thus, the first connection member 311a and the monitor fixing unit 1 may be fixed.

Further, parts of the first connection member 311a disposed along the outer surface thereof at intervals of 90 degrees may protrude towards the monitor fixing unit 1, and thereby, the first connection member 311a may be fixed to the monitor fixing unit 1.

Here, the extending part of the rotating shaft 311 may be inserted into a circular hole formed in the third link 30 so as to be inserted into the third link 30. Further, washers may be provided between the monitor fixing unit 1 and the third link 30 so as to facilitate rotation of the monitor fixing unit 1 at the front end of the third link 30.

Further, the extending part of the rotating shaft 311 inserted into the third link 30 may pass through the first fixing member 312, the rotating member 313, the second disc springs 315 and the second fixing member 316.

The first fixing member 312 may be coupled to the front inner surface of the third link 30. Further, a circular hole may be formed in the central part of the first fixing member 312, and thus, the rotating shaft 311 may be rotated in the circular hole of the first fixing member 312. Further, parts of the first fixing member 312 may protrude in the forward direction, i.e., in a direction towards the third link 30, and may be fixed to the third link 30.

That is, the first fixing member 312 may be fixed to the third link 30, and the rotating shaft 311 passing through the first fixing member 312 may be rotated in the hole formed in the central part of the first fixing member 312.

Further, a plurality of fixing holes 312a spaced apart from the hole formed in the central part of the first fixing member 312 may be formed along the outer surface of the first fixing member 312. Here, the fixing holes 312a formed in the first fixing member 312 may be disposed at upper, lower, left and right regions at intervals of 90 degrees. Further, moving holes 312b may be formed between the fixing holes 312a formed at the intervals of 90 degrees, and thus, the rotating member 313 may be fixed when protruding members 313a, which will be described below, are inserted into the fixing holes 312a, and the rotating member 313 may be moved within the length of the moving holes 312b when the protruding members 313a are inserted into the moving holes 312b. Here, the rotating member 313 may be coupled to the rear part of the first fixing member 312.

The rotating member 313 may be formed to have a circular cross-section. Further, a hole may be formed in the center of the rotating member 313. Here, the hole formed in the center of the rotating member 313 may have the same shape as the cross-section of the rotating shaft 311, and thus, the rotating member 313 may be rotated together with the rotating shaft 311.

That is, when the rotating shaft 311 having passed through the monitor fixing unit 1 is rotated together with the monitor fixing unit 1 in front of the third link 30, the second fixing member 312 having the circular hole maintains the state of being fixed to the third link 30, the rotating shaft 311 is rotated in the hole formed in the center of the first fixing member 312, and the rotating member 313 may be rotated together with the rotating shaft 311.

Further, the protruding members 313a may be provided on the surface of the rotating member 31 towards the first fixing member 312, i.e., the front surface of the rotating member 313. The protruding members 313a may be formed to have a rectangular cross-section.

The protruding members 313a may be inserted into the fixing holes 312a or the moving holes 312b formed in the first fixing member 312. Thereby, rotation or fixation of the rotating member 313, the rotating shaft 311 and the monitor fixing unit 1 fixed to the rotating member 313 may be determined.

Here, the second disc springs 315 configured to move the rotating member 313 by a designated distance forwards or rearwards may be installed in the rear of the rotating member 313 so as to insert or separate the protruding members 313a into or from the plurality of moving holes 312b or the plurality of fixing holes 312a spaced apart from each other.

The second disc springs 315 may be provided in a pair. Further, the second disc springs 315 may be installed such that protruding parts thereof come into contact with each other.

Thereby, the second disc springs 315 may have elasticity, and may thus move the rotating member 313 forwards or rearwards.

For example, when the monitor fixing unit 1 connected to the rotating shaft 311 is pressed rearwards, the rotating member 313 connected to the rotating shaft 311 may be pressed rearwards, and the second disc springs 315 may be compressed so that the rotating member 313 may be moved rearwards by the designated distance.

When the rotating member 31 moved rearwards rotates the monitor fixing unit 1, the monitor fixing unit 1 may be rotated in the state in which the rotating member 31 is pressed, and, when pressing force is released, the rotating member 313 is moved forwards so that the protruding members 313a are inserted into the moving holes 312b or the fixing holes 312a, thereby being capable of moving or fixing the monitor fixing unit 1. That is, the rotating shaft 311, the first fixing member 312, the rotating member 313, and the second fixing member 316, which will be described below, may be rotated together with the monitor fixing unit 1.

Here, the second fixing member 316 may be fixed in the rear of the second disc springs 315 so as to prevent the second disc springs 315 from being released rearwards.

The second fixing member 316 may be formed to have a circular cross section. Further, a hole having the same shape as the cross-section of the extending part of the rotating shaft 311 is formed in the center of the second fixing member 316, and thus, the second fixing member 316 may be rotated together with the rotating shaft 311.

Further, a first prevention member 317 may be coupled to the rear part of the second fixing member 316 in the inward direction of the rotating shaft 311. Here, the first prevention member 317 may protrude from the rear end of the rotting shaft 311 towards the rotating shaft 311, and may be inserted into the rear end of the rotating shaft 311 so as to be fixed to the rotating shaft 311.

Thereby, the first prevention member 317 may prevent the members provided on the extending part of the rotating shaft 311 from being separated rearwards from the rotating shaft 311. That is, the first prevention member 317 may be formed in a rivet type, may prevent the first fixing member 312, the rotating member 313, the second disc springs 315 and the second fixing member 316 from being separated rearwards, and may substitute for a nut, thereby being capable of achieving cost reduction.

As described above, the first connection unit 310 allows the monitor fixing unit 1 to be moved rearwards, to be rotated, and to be fixed at intervals of 90 degrees, and may thus facilitate rotation of the monitor fixed to the monitor fixing unit 1, thereby enabling a user to easily use the monitor.

Here, the second connection unit 330 which connects the third link 30 to the first link 10 so that the third link 30 is rotatable with respect to the first link 10 may be coupled to the rear part of the first connection unit 310.

Further, the second connection unit 330 may be installed in the third link 30. The second connection unit 330 may be located in the rear of the first connection unit 310. The second connection unit 330 may be provided in a direction perpendicular to the direction of extension of the first connection unit 310. Further, the second connection unit 330 may be installed in a direction perpendicular to the direction of coupling of the first rotational coupling unit 100.

The second connection unit 330 may be configured to move the third link 30 in the upward and downward directions with respect to the first link 10, and may include a second coupling member 331, third disc springs 336, and a coil spring 335.

The second coupling member 331 may be coupled to the third link 30 in a direction perpendicular to the rotating shaft 311, i.e., the leftward and rightward directions. Here, the second coupling member 331 may be formed in a rivet type. For example, the second coupling member 331 may pass through the front end of the first link 10, which extends from the monitor fixing unit 1 and has one side coupled to the first rotational coupling unit, i.e., the end of the first link 10 towards the monitor fixing unit 1, and the third link 30 coupled to the monitor fixing unit 1, and, in this state, the second coupling member 331 may be coupled to the front end of the first link 10 and the third link 30 by riveting. Thereby, the third link 30 may be rotated in the upward and downward directions with respect to the first link 10 coupled to the outer surface of the second coupling member 331.

Further, the coil spring 335 may be provided on the outer surface of the second coupling member 331 located in the third link 30.

The coil spring 335 is disposed to be wound on the second coupling member 331 in the first link 10, and provides elastic resistance in a direction of pushing the first link 10 so as to fix the angle of the monitor fixing unit 1 adjusted in the upward and downward direction through the third disc springs 336.

Further, the third disc springs 336 may be installed between the C-shaped first link protruding parts 10*a* and the left end of the coil spring 335.

The third disc springs 336 may be provided on the outer surface of the part of the second coupling member 331 opposite to the head part of the second coupling member 331. Here, the third disc springs 336 may be located on the inner surface of the first link 10, and may thus generate axial elastic force as the third link 30 is rotated.

That is, the third disc springs 336 are disc-shaped washers formed of an elastic material, and generate rotating torque through repetition of compression and release of compression due to shape characteristics thereof when the third link 30 is rotated upwards and downwards.

Although one embodiment of the present disclosure describes four third disc springs 336 which overlap each other, the present disclosure is not limited thereto, and a larger number of third disc springs may be disposed to overlap each other so as to generate stronger axial elastic force when the second coupling member 331 is rotated to be coupled to the third link 30 and the first link 10.

Thereby, the monitor fixing unit 1 and the third link 30 coupled to the monitor fixing unit 1 may be coupled to the first link 10 so as to be rotatable in the upward and downward directions of the first link 10.

Here, a second prevention member 337, which is inserted into the second coupling member 331, may be coupled to the right end of the second coupling member 331. Here, the second prevention member 337 may be provided at the right of the second coupling member 331 so as to protrude towards the second coupling member 331, and may be inserted into the second coupling member 331 so as to be fixed to the second coupling member 331.

Thereby, the second prevention member 337 may prevent the members provided on the extending part of the second coupling member 331 from being separated leftwards from the second coupling member 331. That is, the second prevention member 337 may be formed in a rivet type, may prevent the second coupling member 331, the third disc springs 336 and the coil spring 335 from being separated leftwards, and may substitute for a nut, thereby being capable of achieving cost reduction.

Through the first rotational coupling unit 100 and the second rotational coupling unit 300 according to one embodiment of the present disclosure, the monitor fixing unit 1 may be rotated, as seen from the front, and may be pressed in the forward and rearward directions, and thus, a user may select rotation or fixation of the monitor fixing unit 1, and the monitor fixing unit 1 may be rotated upwards and downwards about the second coupling member 331 and may be rotated leftwards and rightwards about the first coupling member 110, and thus, the angle of the monitor fixing unit 1 may be adjusted in various directions, thereby being capable of improving user convenience, and reducing internal coupling costs through rivet-type coupling.

Referring to FIGS. 1 to 9, according to one aspect of the present disclosure, a display stand may include: a display fixing unit 1; a first link 10 coupled to the display fixing unit 1; a second link 20 which is opposite to the display fixing unit 1 with respect to the first link 10, and to which the first link 10 is rotatably coupled; a first coupling member 110 providing a rotation axis of the first link 10 and coupled to an inner side of the second link 20 through the first link 10; and a bush 140 positioned between an outer surface of the first coupling member 110 and an inner surface of the first link 10, and through which the first coupling member 110 passes, wherein a portion of the bush 140 may be positioned on the first link 10 and presses the first link 10.

The display stand may further include a first toothed lock washer 150 which is opposite the first link 10 with respect to the portion of the bush 140, and through which the first coupling member 110 passes, wherein the first toothed lock washer 150 may include a connection member 151 inserted into a mount recess formed at the second link 20.

The first toothed lock washer 150 may be positioned between a head of the first coupling member 110 and the portion of the bush 140, and wherein the head of the first coupling member 110 may be positioned on the first toothed lock washer 150.

The first toothed washer 150 may be positioned between the portion of the bush 140 and the inner side of the second link 20.

The first coupling member 110 may be screw-fastened to the inner side of the second link 20.

The display stand may further include: a first disc spring 120 positioned between the bush 140 and the first toothed lock washer 150 and through which the first coupling member 110 passes, the first disc spring 120 providing an elastic force in an axial direction of the first coupling member 110; and a space washer 130 positioned between the bush 140 and the first disc spring 120 and through which the first coupling member 110 passes.

The bush 140 may include: an upper bush 140a caught at one surface of the first link 10; and a lower bush 140b caught at the other surface of the first link 10, wherein the first toothed lock washer 150 may include: a first upper toothed lock washer opposite the first link 10 with respect to the upper bush 140a; and a first lower toothed lock washer opposite the first link 10 with respect to the lower bush 140b, wherein the first disc spring 120 may be positioned between the upper bush 140a and the first upper toothed lock washer, and wherein the space washer 130 include: an upper space washer positioned between the upper bush 140a and the first disc spring 120; and a lower space washer positioned between the lower bush 140b and the first lower toothed lock washer.

The display stand may further include a third link 30 connecting the display fixing unit 1 and the first link 10, wherein the display fixing unit 1 may be rotatably coupled to the third link 30 about a rotation axis perpendicular to the display fixing unit 1.

The display stand may further include: a rotating shaft 311 passing through the display fixing unit 1 and the third link 30, fixed to the display fixing unit 1, and rotatable with respect to the third link 30; a second fixing member 316 fixed to an end of the rotating shaft 311; and a second disc spring 315 positioned between the third link 30 and the second fixing member 316, through which the rotating shaft 311 rotatably passes, and providing an elastic force in an axial direction of the rotating shaft 311.

The display stand may further include: a first fixing member 312 positioned the third link 30 and the second disc spring 315, fixed to the third link 30, and through which the rotating shaft 311 rotatably passes; and a rotating member 313 positioned between the first fixing member 312 and the second disc spring 315, and to which the rotating shaft 311 is fixed.

The rotating member 313 may include a plurality of protruding members 313a protruding from one surface of the rotating member 313 toward the first fixing member 312, wherein the first fixing member 312 may include: a plurality of fixing holes 312a spaced apart from each other in a circumferential direction of the first fixing member 312; and a plurality of moving holes 312b alternately arranged with the plurality of fixing holes 312a, wherein the fixing hole 312a may have a size corresponding to the protruding member 313a, and wherein a width of the moving hole 312b may be greater than a width of the fixing hole 312a in the circumferential direction of the first fixing member 312.

The display fixing unit 1 and the third link 30 may be coupled to the first link 10 to be rotatable about a third rotation axis, the third rotation axis perpendicular to a first rotation axis which is the rotation axis of the first link 10 with respect to the second link 20 and a second rotation axis which is the rotation axis of the display fixing unit 1 with respect to the third link 30.

The display stand may further include: a second coupling member 331 passing through the third link 30 and the first link 10 and providing the third rotation axis; a coil spring 335 wound around an outer circumferential surface of the second coupling member 331, and having one end contacting the third link 30 and the other end contacting the first link 10; and a third disc spring 336 adjacent to the coil spring 335, through which the second coupling member 331 passes, and providing an elastic force in an axial direction of the second coupling member 331.

The second link 20 may be coupled to the display support.

According to another aspect of the present disclosure, a display stand may include: a first rotational coupling unit 100, wherein the first rotational coupling unit 100 include: a first coupling member 110 installed in a central part of a first link 10 connected to a display fixing unit 1, and configured to pass through the first link 10 and a second link 20 connected to a display support so as to allow the first link 10 and the second link 20 to be rotatable in leftward and rightward directions; a metal bush 140 installed on an outer surface of the first coupling member 110 so as to surround the first coupling member 110, and inserted into the first link 10 so as to press the first link 10 due to rotation of the first coupling member 110; and a first toothed lock washer 150 installed on the outer surface of the first coupling member 110 so as to surround the first coupling member 110, disposed on outer surfaces of the metal bush 140, and configured to have a plurality of connection members 151 provided towards an inner surface of the first link 10 so as to be pressed against an inner surface of the second link 20.

The first rotational coupling unit 100 may further include: a first disc spring 120 installed between the metal bush 140 and the first toothed lock washer 150 so as to generate axial elastic force depending on rotation of the first coupling member 110 in a coupling direction; and a space washer 130 installed between the first disc spring 120 and the metal bush 140 so as to transmit the axial elastic force of the first disc spring 120.

A through hole may be formed in a central part of the first toothed lock washer 150 so that the first coupling member 110 passes through the through hole, and the connection members 151 configured to extend from both ends of the first toothed lock washer 150 may be inserted into mount recesses formed in the second link 20.

The metal bush 140 may include: an upper metal bush 140a configured to have a reversed L-shaped cross-section so as to be fixed to a fixing recess 13 formed in an upper part of the first link 10; and a lower metal bush 140b configured to have the same cross-section as the upper metal bush 140a so as to be fixed to a fixing recess 13 formed in a lower part of the first link 10.

The first toothed lock washer 150 may be fixed to one surface of the space washer 130 disposed to come into contact with the metal bush 140, and may prevent contact of the space washer rotated together with the metal bush 140 with the second link 20.

A screw thread may be formed on an outer circumferential surface of one end of the coupling member 110 inserted into the second link 20, and the first coupling member 110 may be inserted into a coupling hole formed in a lower part of the second link 20 when the first coupling member 110 is rotated.

The display stand may further include a stopper provided on an outer surface of the second link 20 so as to press one end of the coupling member 110.

According to yet another aspect of the present disclosure, a display stand may include: a third link 30 installed in which a first link 10 connected to a display fixing unit 1 and a second link 20 connected to a display support are rotatably installed in a left and right directions, and which is installed between the display fixing unit 1 and the first link 10 so as to be fixed to the display fixing unit 1; and a second rotational coupling unit 300 installed between the third link 30 and the first link 101 so as to enable the third link 30 to be rotated upwards and downwards with respect to the first link 10 and to enable the display fixing unit 1 to be rotated 360 degrees in front of the third link 30.

The second rotational coupling unit 300 may include: a first connection unit 310 configured to connect the display fixing unit 1 to the third link 30 and to press the display fixing unit 1 so as to move the display fixing unit 1 rearwards and then to rotate the display fixing unit 1; and a second connection unit 330 configured to connect the third link 30 to the first link 10 so as to rotate the third link 30 upwards and downwards with respect to the first link 10.

The first connection unit 310 may include: a rotating shaft 311 configured to have both side surfaces configured to be flat and arc-shaped upper and lower surfaces, and to pass through the display fixing unit 1 and the third link 30 so as to be coupled thereto; a first fixing member 312 configured to have a central hole formed in a center thereof, one surface coupled to an inner surface of the third link 30, rotation holes 312a and 312b formed in the first fixing member 312 at intervals of 90 degrees, and protruding parts configured to protrude towards the third link 30; a rotating member 313 configured to have one surface coupled to a remaining surface of the first fixing member 312, a hole formed in a center of the rotating member 313 so as to have a shape corresponding to the rotating shaft 311 so that the rotating shaft 311 is fixedly inserted into the hole, and protruding members 313a provided on the surface of the rotating member 313, configured to face the rotation holes 312a and 312b of the first fixing member 312; a pair of disc springs 315 coupled to a remaining surface of the rotating member 313, and compressed when the first fixing member 313 is pressed; and a second fixing member 316 configured to have one surface fixed to an outer surface of an outer one of the disc springs 315 opposite to the rotating member 313, and a hole formed in a center of the second fixing member 316 so as to have the shape corresponding to the rotating shaft 311.

According to still another aspect of the present disclosure, a display device may include: a display; and a display stand to which the display is coupled.

As described above, a display stand according to the present disclosure generates rotating torque in the leftward, rightward, upward and downward directions through coupling of disc springs in a hinge structure in which a plurality of washers and bushes are coupled to a coupling member serving as a rotating shaft, thereby being capable of adjusting and fixing the angle of a monitor.

Further, the display stand according to the present disclosure includes a toothed lock washer in a first rotational coupling unit, thereby being capable of preventing the coupling member from being loosened from the hinge structure even when the angle the monitor is repeatedly adjusted.

In addition, the display stand according to the present disclosure allows a monitor fixing unit to be moved along a rotating shaft by only 90 degrees each through guide holes in the state in which the monitor fixing unit is coupled to a link, and may thus convert the monitor into the horizontal or vertical direction, thereby being capable of improving user convenience.

As is apparent from the above description, a display stand according to the present disclosure generates rotating torque in the leftward, rightward, upward and downward directions through coupling of disc springs in a hinge structure in which a plurality of washers and bushes are coupled to a coupling member serving as a rotating shaft, thereby being capable of adjusting and fixing the angle of a monitor.

Further, the display stand according to the present disclosure includes a toothed lock washer between the coupling member and the disc spring, thereby being capable of preventing the coupling member from being loosened in the hinge structure even when the angle the monitor is repeatedly adjusted.

In addition, the display stand according to the present disclosure allows a monitor fixing unit to be moved along a rotating shaft by only 90 degrees each through guide holes in the state in which the monitor fixing unit is coupled to a link, and may thus convert the monitor into the horizontal or vertical direction, thereby being capable of improving user convenience.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A display stand, comprising:
    a display fixing unit;
    a first link coupled to the display fixing unit;
    a second link which is opposite to the display fixing unit with respect to the first link, and to which the first link is rotatably coupled;
    a first coupling member providing a rotation axis of the first link and coupled to the second link through the first link, the first coupling member including a head opposite the first link; and
    a first toothed lock washer which is positioned between the first link and the head of the first coupling member, and through which the first coupling member passes,
    wherein the first toothed lock washer is directly fixed to the second link.

2. The display stand of claim 1,
    wherein the first toothed lock washer comprises a connection member inserted into a mount recess formed at the second link.

3. The display stand of claim 1, further comprising a bush positioned between an outer surface of the first coupling member and an inner surface of the first link, and through which the first coupling member passes, the bush including a portion positioned between the first link and the first toothed lock washer, and
    wherein the head of the first coupling member is positioned on the first toothed lock washer.

4. The display stand of claim 1, wherein the first coupling member is coupled to an inner side of the second link.

5. The display stand of claim 4, wherein the first coupling member is screw-fastened to the inner side of the second link.

6. The display stand of claim 3, further comprising:
    a first disc spring positioned between the bush and the first toothed lock washer and through which the first coupling member passes, the first disc spring providing an elastic force in an axial direction of the first coupling member; and
    a space washer positioned between the bush and the first disc spring and through which the first coupling member passes.

7. The display stand of claim 6, wherein the bush comprises:
    an upper bush caught at one surface of the first link; and
    a lower bush caught at the other surface of the first link, wherein the first toothed lock washer comprises:
a first upper toothed lock washer opposite the first link with respect to the upper bush; and
a first lower toothed lock washer opposite the first link with respect to the lower bush,
wherein the first disc spring is positioned between the upper bush and the first upper toothed lock washer, and
wherein the space washer comprises:
an upper space washer positioned between the upper bush and the first disc spring; and
a lower space washer positioned between the lower bush and the first lower toothed lock washer.

8. The display stand of claim 1, further comprising a third link connecting the display fixing unit and the first link,
wherein the display fixing unit is rotatably coupled to the third link about a rotation axis perpendicular to the display fixing unit.

9. The display stand of claim 8, further comprising:
a rotating shaft passing through the display fixing unit and the third link, and providing the rotation axis of the display fixing unit with respect to the third link;
a second fixing member fixed to an end of the rotating shaft; and
a second disc spring positioned between the third link and the second fixing member, through which the rotating shaft rotatably passes, and providing an elastic force in an axial direction of the rotating shaft.

10. The display stand of claim 9, wherein the rotating shaft is fixed to the display fixing unit and is rotatable with respect to the third link, and
the display stand further comprises:
a first fixing member positioned the third link and the second disc spring, fixed to the third link, and through which the rotating shaft rotatably passes; and
a rotating member positioned between the first fixing member and the second disc spring, and to which the rotating shaft is fixed.

11. The display stand of claim 10, wherein the rotating member comprises a plurality of protruding members protruding from one surface of the rotating member toward the first fixing member,
wherein the first fixing member comprises:
a plurality of fixing holes spaced apart from each other in a circumferential direction of the first fixing member; and
a plurality of moving holes alternately arranged with the plurality of fixing holes,
wherein the fixing hole has a size corresponding to the protruding member, and
wherein a width of the moving hole is greater than a width of the fixing hole in the circumferential direction of the first fixing member.

12. The display stand of claim 8, wherein the display fixing unit and the third link are coupled to the first link to be rotatable about a third rotation axis, the third rotation axis perpendicular to a first rotation axis which is the rotation axis of the first link with respect to the second link and a second rotation axis which is the rotation axis of the display fixing unit with respect to the third link.

13. The display stand of claim 12, further comprising:
a second coupling member passing through the third link and the first link and providing the third rotation axis;
a coil spring wound around an outer circumferential surface of the second coupling member, and having one end contacting the third link and the other end contacting the first link; and
a third disc spring through which the second coupling member passes, and providing an elastic force in an axial direction of the second coupling member.

14. The display stand of claim 1, wherein the second link is coupled to a display support.

15. A display device, comprising:
a display; and
a display stand of claim 1 to which the display is coupled.

* * * * *